US009695290B2

(12) United States Patent
Malakoff (10) Patent No.: US 9,695,290 B2
(45) Date of Patent: Jul. 4, 2017

(54) FILMS COMPRISING ETHYLENE-BASED POLYMERS AND METHODS OF MAKING SAME (71) Applicant: ExxonMobil Chemical Patents Inc., Baytown, TX (US)

(72) Inventor: Alan M. Malakoff, Boynton Beach, FL (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 292 days.

(21) Appl. No.: 14/438,044

(22) PCT Filed: Sep. 30, 2013

(86) PCT No.: PCT/US2013/062574
§ 371 (c)(1),
(2) Date: Apr. 23, 2015

(87) PCT Pub. No.: WO2014/081505
PCT Pub. Date: May 30, 2014

(65) Prior Publication Data
US 2015/0291748 A1 Oct. 15, 2015

Related U.S. Application Data (60) Provisional application No. 61/729,061, filed on Nov. 21, 2012.

(30) Foreign Application Priority Data

Jan. 23, 2013 (EP) .................................... 13152304

(51) Int. Cl.
C08L 23/08 (2006.01)
C08J 5/18 (2006.01)
B32B 27/32 (2006.01)
B32B 27/08 (2006.01)

(52) U.S. Cl.
CPC ............... *C08J 5/18* (2013.01); *B32B 27/08* (2013.01); *B32B 27/32* (2013.01); *B32B 27/327* (2013.01); *C08L 23/0815* (2013.01); B32B 2307/514 (2013.01); B32B 2307/54 (2013.01); B32B 2307/558 (2013.01); B32B 2307/5825 (2013.01); B32B 2439/06 (2013.01); B32B 2439/46 (2013.01); *C08J 2323/08* (2013.01); C08L 2205/025 (2013.01); C08L 2314/06 (2013.01)

(58) Field of Classification Search
CPC ...... C08L 23/0815; C08L 23/08; B32B 27/32; B32B 27/08
See application file for complete search history.

(56) References Cited

U.S. PATENT DOCUMENTS

| 3,248,179 | A | | 4/1966 | Norwood |
| 4,543,399 | A | | 9/1985 | Jenkins, III et al. |
| 4,588,790 | A | | 5/1986 | Jenkins, III et al. |
| 4,613,484 | A | | 9/1986 | Ayres et al. |
| 5,008,204 | A | | 4/1991 | Stehling |
| 5,028,670 | A | | 7/1991 | Chinh et al. |
| 5,317,036 | A | | 5/1994 | Brady, III et al. |
| 5,352,749 | A | | 10/1994 | DeChellis et al. |
| 5,382,631 | A | * | 1/1995 | Stehling ............ C08L 23/0815 525/240 |
| 5,405,922 | A | | 4/1995 | DeChellis et al. |
| 5,436,304 | A | | 7/1995 | Griffin et al. |
| 5,453,471 | A | | 9/1995 | Bernier et al. |
| 5,462,999 | A | | 10/1995 | Griffin et al. |
| 5,616,661 | A | | 4/1997 | Eisinger et al. |
| 5,627,242 | A | | 5/1997 | Jacobsen et al. |
| 5,665,818 | A | | 9/1997 | Tilston et al. |
| 5,668,228 | A | | 9/1997 | Chinh et al. |
| 5,677,375 | A | | 10/1997 | Rifi et al. |
| 6,242,545 | B1 | | 6/2001 | Jejelowo et al. |
| 6,248,845 | B1 | | 6/2001 | Loveday et al. |
| 6,956,088 | B2 | | 10/2005 | Farley et al. |
| 2010/0029871 | A1 | * | 2/2010 | Crowther ............ B01J 31/0239 526/126 |
| 2010/0113718 | A1 | * | 5/2010 | Mehta ................... C08F 110/06 526/127 |
| 2013/0224463 | A1 | * | 8/2013 | Shirodkar ............... C08L 23/06 428/220 |
| 2016/0060430 | A1 | * | 3/2016 | Smits ..................... C08K 5/524 524/151 |

FOREIGN PATENT DOCUMENTS

| EP | 634421 | 1/1995 |
| EP | 794200 | 9/1997 |
| EP | 802202 | 10/1997 |
| WO | 93/03093 | 2/1993 |
| WO | 96/08520 | 3/1996 |
| WO | 98/21276 | 5/1998 |
| WO | 98/26000 | 6/1998 |
| WO | 99/29737 | 6/1999 |
| WO | 2012/112259 | 8/2012 |

OTHER PUBLICATIONS

Macromolecules, vol. 34, No. 19, p. 6812 (2001).
J.Poly Sci.Poly. Phys. Ed. vol. 20, p. 441 (1982).
James C. Randall (1989) "A review of high resolution Liquid 13 carbon nuclear magnetic resonance characterizations of Ethylene-based polymers", Journal of Macromolecular Science, Part C: Polymer Reviews, 29:2-3, 201-317.

* cited by examiner

Primary Examiner — Margaret Moore
(74) Attorney, Agent, or Firm — Leandro Arechederra, III (57) ABSTRACT Films including a Layer A comprising 50.0 to 100.0 wt. %, based on the weight of the Layer A, of an ethylene-based polymer composition having therein a hafnium:zirconium (ppm/ppm) ratio >1.0, a CDBI less than 50%, and a $g'_{vis} \geq 0.98$; wherein the Layer A is substantially free of polyethylene having $0.50 \leq g'_{vis} \leq 0.85$ are described. Particular films are suitable as cast films for TD shrink and draw tape bag applications.

25 Claims, 3 Drawing Sheets

FILMS COMPRISING ETHYLENE-BASED POLYMERS AND METHODS OF MAKING SAME

CROSS-REFERENCE OF RELATED APPLICATIONS

This application is a National Stage Application of International Application No. PCT/US2013/062574, filed Sep. 30, 2013, which claims the benefit of Ser. No. 61/729,061, filed Nov. 21, 2012, and EP Patent Application No. 13152304.5, filed on Jan. 23, 2013, the disclosures of which are incorporated by reference in their entireties.

FIELD OF THE INVENTION

Embodiments described herein generally relate to films comprising ethylene-based polymer and methods of making such films.

BACKGROUND OF THE INVENTION

Polyethylene polymers, blends thereof with other polymers, and articles made therefrom are generally known in the art. Many varieties of polyethylene polymers have been prepared over the years, including those made using high pressure free radical chemistry (LDPE), traditional linear low density polyethylene (LLDPE) typically made using Ziegler-Natta processes, and polyethylene made by metallocene or other catalysts. Generally, polyethylenes made by different processes have different molecular architectures and distribution characteristics giving rise to varying positives and negatives, depending on application or end-use.

One way to categorize polyethylene polymers is based on the presence, amount, and character of long-chain branching in the distribution of polymer molecules. Generally, long chain branches are those branches longer than branches resulting from direct incorporation of monomer. The presence of long chain branches is generally believed to relate to shrink properties of resulting films. Thus, polyethylenes without significant levels of long-chain branching have been thought to be unsuitable for use in shrink film applications.

On the other hand, polyethylenes without significant long-chain branching have been known to provide improved film properties related to MD tear resistance and dart impact strength continue to be sought. A polyethylene having an improved combination of these properties and versatility in film applications is still needed to meet performance and applications targets.

Background references are U.S. Pat. Nos. 5,382,631; 6,956,088; WO 98/26000 and WO 2012/112259.

SUMMARY OF THE INVENTION

In an aspect, embodiments provide a film, comprising: a Layer A comprising 50.0 to 100.0 wt. %, based on the weight of the Layer A, of an ethylene-based polymer composition, the ethylene-based polymer composition having therein a hafnium:zirconium (ppm/ppm) ratio >1.0, a CDBI<50%, and a $g'_{vis} \geq 0.98$; wherein the Layer A is substantially free of a polyethylene having a $g'_{vis}$ of 0.50 to 0.85, particularly a high pressure polyethylene.

In another aspect, embodiments described herein provide a method of increasing TD shrink, the method comprising: a) providing a polyethylene composition comprising 50.0 to 100.0 wt. %, of an ethylene-based polymer, the ethylene-based polymer composition having a hafnium:zirconium (ppm/ppm) ratio >1.0, a CDBI less than 50%, and a $g'_{vis} \geq 0.98$; and 0 to 50.0 wt. % of a second ethylene-based polymer, the second ethylene-based polymer composition having a hafnium:zirconium (ppm/ppm) ratio <1.0 and a $g'_{vis} \geq 0.98$; all wt. % values based on the weight of the composition; b) forming the polyethylene composition into a film; and c) orienting the film in at least the transverse direction; wherein the film has a TD shrink at least 10% greater than the TD shrink of a reference film, the reference film consisting essentially of the second ethylene-based polymer.

In still another aspect, embodiments described herein relate to a film, consisting essentially of a Layer A comprising 90.0 to 100.0 wt. %, based on the weight of the film, of an ethylene-based polymer, the ethylene-based polymer composition having a hafnium:zirconium (ppm/ppm) ratio >1.0, a CDBI less than 50%, a density of 0.940 to 0.965 g/cm³, and a $g'_{vis} \geq 0.98$; wherein the film is substantially free of a polyethylene having a $g'_{vis}$ of 0.50 to 0.85, particularly a high pressure polyethylene, and wherein the film has a TD shrink of at least 10.0% greater than a reference film consisting essentially of a second ethylene-based polymer, the second ethylene-based polymer composition having a hafnium:zirconium (ppm/ppm) ratio <1.0 and a $g'_{vis} \geq 0.98$.

In yet another aspect, embodiments described herein provide a cast film consisting essentially of a Layer A comprising 90.0 to 100.0 wt. %, based on the weight of the film of an ethylene-based polymer, the ethylene-based polymer composition having a hafnium:zirconium (ppm/ppm) ratio >1.0, a CDBI less than 50%, and a $g'_{vis} \geq 0.98$; wherein the film is substantially free of a polyethylene having a $g'_{vis}$ of 0.50 to 0.85, particularly a high pressure polyethylene, and wherein the film has a Dart A Impact Strength of >400.0 g/mil, particularly 400.0 to 1400.0 g/mil and an MD Elmendorf Tear of >400.0 g/mil, particularly 400.0 to 2000.0 g/mil.

In still another aspect, embodiments provide a draw tape bag comprising: a bag structure having a hem and a thermoplastic draw tape housed within the hem, the bag structure comprising: a Layer A comprising 90.0 to 100.0 wt. %, based on the weight of the film of an ethylene-based polymer, the ethylene-based polymer composition having a hafnium:zirconium (ppm/ppm) ratio >1.0, a CDBI less than 50%, and a $g'_{vis} \geq 0.98$; and a density of 0.910 to about 0.930 g/cm³, wherein the film is substantially free of a polyethylene having a $g'_{vis}$ of 0.50 to 0.85, and wherein the film has a Dart A Impact Strength of 400.0 to 1400.0 g/mil and an MD Elmendorf Tear of 400.0 to 2000.0 g/mil.

DETAILED DESCRIPTION OF THE INVENTION

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference, the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

The term "substantially free" as used herein means <10 wt. %. Some embodiments that are substantially free of a component have <5.0 wt. %, <3.0 wt. %, <2.0 wt. %, 1.0 wt. %, <0.5 wt. %, or <0.1 wt. % of the recited component. Some embodiments are essentially free of the recited component, meaning that the recited component is present at a level of <0.05 wt. % or the component is not purposely added to the composition.

Molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by:

$$M_w = \frac{\sum_i n_i M_i^2}{\sum_i n_i M_i}$$

The number average molecular weight is given by:

$$M_n = \frac{\sum_i n_i M_i}{\sum_i n_i}$$

The z-average molecular weight is given by:

$$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, p. 6812 (2001). All molecular weights are weight average ($M_w$) unless otherwise noted.

Composition distribution breadth index ("CDBI") is defined as the weight percentage of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, Vol. 20, p. 441 (1982) and U.S. Pat. No. 5,008,204, which are fully incorporated herein by reference.

Solubility distribution breadth index ("SDBI") is used as a measure of the breadth of the solubility distribution curve for a given polymer. The procedure used herein for calculating SDBI is as described in WO 93/03093, pp. 16-18, published Feb. 18, 1993.

Both CDBI and SDBI may also be determined using data obtained via CRYSTAF. In such cases, a commercial CRYSTAF model 200 instrument (PolymerChar S.A.) is used for chemical composition distribution (CCD) analysis. Approximately 20 to 30 mg of polymer is placed into each reactor and dissolved in 30 mL of 1,2 dichlorobenzene at 160° C. for approximately 60 minutes, then allowed to equilibrate for approximately 45 minutes at 100° C. The polymer solution is then cooled to either 30° C. (standard procedure) or 0° C. (cryo procedure) using a cooling rate of 0.2° C./min. A two wavelength infrared detector is then used to measure the polymer concentration during crystallization (3.5 μm, 2853 $cm^{-1}$ sym. stretch) and to compensate for base line drifts (3.6 μm) during the analysis time. The solution concentration is monitored at certain temperature intervals, yielding a cumulative concentration curve. The derivative of this curve with respect to temperature represents the weight fraction of crystallized polymer at each temperature. In both standard and cryo procedures, any resin in solution below the temperature to which the solution is cooled is defined as "% solubles." The cryo procedure outlined above, i.e., cooling to 0° C., typically provides greater detail, especially for amorphous samples that tend to stay in solution at or around 30° C.

"Melt index" is determined according to ASTM D-1238-E (190° C./2.16 kg), also sometimes referred to as $I_{2.16}$. High load melt index is determined according to ASTM D-1238-F (190° C./21.6 kg), also sometimes referred to as $I_{21.6}$. The term melt index ratio refers to the ratio of the high load melt index to the melt index (i.e., $I_{21.6}/I_{2.16}$).

Density, reported in grams per cubic centimeter (g/cm³), was determined using chips cut from plaques compression molded in accordance with ASTM D-1928 Procedure C, aged in accordance with ASTM D-618 Procedure A, and measured as specified by ASTM D-1505.

1% Secant Modulus (M), reported in pounds per square inch (lb/in² or psi), is measured as specified by ASTM D-882.

Tensile @ Yield, reported in pounds per square inch (lb/in² or psi), is measured as specified by ASTM D-882.

Elongation @ Yield, reported in %, is measured as specified by ASTM D-882.

Ultimate Tensile, reported in pounds per square inch (lb/in² or psi), is measured as specified by ASTM D-882.

Break Elongation, reported in %, is measured as specified by ASTM D-882.

Dart A Impact or Dart Drop Impact Strength (DIS), reported in grams (g) and/or grams per mil (g/mil), is measured using a smooth black phenolic head, material C, as specified by ASTM D-1709, method A.

Elmendorf Tear values are determined in accordance with ASTM D 1922.

Peak Puncture Force, reported in pounds (lb) and/or pounds per μm (lb/mil), is determined according to ASTM D-3763.

TD shrink, reported as a percentage change with respect to the original MD or TD dimension, is measured by cutting circular specimens from a film using a 100 mm die. The samples are marked in their respective directions, dusted with talc, and placed on a pre-heated, talc covered tile. The samples are then heated using a heat gun (model HG-501A) for approximately 10 to 45 seconds, or until the dimensional change ceases. An average of three specimens is reported. A negative shrinkage number indicates expansion of a dimension after heating when compared to its pre-heating dimension.

Gauge, reported in μm or mil, is measured using a Measuretech Series 200 or a Heidenhain instrument. The instrument measures film thickness using a capacitance gauge. For each film sample, ten film thickness datapoints are measured per inch of film as the film is passed through the gauge in a transverse direction. From these measurements, an average gauge measurement is determined and reported. Where any of the above properties are reported in pounds per square inch, grams per μm, or in any other dimensions that are reported per unit area or per unit thickness, the ASTM methods cited for each property have been followed except that the film gauge is measured in accordance with ASTM D-374, Method C.

45° Gloss is measured as specified by ASTM D2457.

Haze is typically reported as a percentage and is measured as specified by ASTM D1003.

Where applicable, the properties and descriptions below are intended to encompass measurements in both the machine and transverse directions. Such measurements are reported separately with the designation "MD" indicating a measurement in the machine direction and "TD" indicating a measurement in the transverse direction.

Films

The ethylene-based polymer compositions described herein are particularly useful in monolayer films. Such films show a surprising combination of properties. For example, the compositions can surprisingly perform as shrink films despite the absence of long-chain branching consistent with a $g'_{vis}$ value ≥0.98. Some ethylene-based polymers can provide films with a surprising combination of MD Elmendorf Tear value and Dart A Impact strength. Other embodiments are particularly suitable for draw tape bags formed in a cast film processes.

When used in multilayer films, the polymer compositions described herein, particularly the ethylene-based polymer, may be used in any layer of the film, or in more than one layer of the film, as desired. When more than one layer of the film comprises such a polymer composition, each such layer can be individually formulated, i.e., the layers comprising such a polymer composition can be the same or different within the scope of the claims, depending upon the desired properties of the film.

The term "film" may refer to monolayer or multilayer structures. A film may be formed by any suitable means, e.g., extrusion molding, cast, or blown film techniques. When used in multilayer films, the various polymers described herein can be used in any layer of the film unless otherwise indicated. Multilayer films may be made by processes wherein each layer is individually or separately formulated; i.e., the layers formed of or including the polymer composition can have the same or different chemical composition, density, melt index, thickness, etc., depending upon the desired properties of the film.

To facilitate discussion of different film structures of the invention, the following notation is used herein. Each layer of a film is denoted "A" or "B", where "A" indicates one film layer, preferably an inner film layer, and "B" indicates a different film layer. Where a film includes more than one A layer or more than one B layer, one or more prime symbols (', '', ''', etc.) are appended to the A or B symbol to indicate layers of the same type (conventional or inventive) that can be the same or can differ in one or more properties, such as chemical composition, density, melt index, thickness, and the like, within the range of the parameters defined herein. Finally, the symbols for adjacent layers are separated by a slash (/). Using this notation, a three-layer film having an inner layer, which is also referred to herein as a "core layer" disposed between two outer film layers, the layers would be denoted A/B/A'. Similarly, a five-layer film of alternating layers would be denoted A/B/A'/B'/A''. Unless otherwise indicated, the left-to-right or right-to-left order of layers does not matter, nor does the order of prime symbols; e.g., an AB film is equivalent to a B/A film, and an A/A'/B/A'' film is equivalent to an A/B/A'/A'' film, for purposes of the present invention. The relative thickness of each film layer is similarly denoted, with the thickness of each layer relative to a total film thickness of 100 (dimensionless) is indicated numerically and separated by slashes; e.g., the thickness of an A/B/A' film having A and A' layers of 10 microns each and a B layer of 30 microns is denoted as 20/60/20.

Consistent with this understanding of multilayer structures, the description focuses on the compositions and properties of a Layer A, but such layers may be combined with other layers to form a multilayer film, e.g., further comprising a Layer B in surface contact with a first side of Layer A; and Layer C in surface contact with a second side of Layer A. The compositions of Layers B and C may be the same or different and may be selected according to the desired performance criteria.

Thus, some embodiments provide a film, comprising: a Layer A comprising 50.0 to 100.0 wt. %, based on the weight of the Layer A, of an ethylene-based polymer composition, the ethylene-based polymer composition having therein a hafnium:zirconium (ppm/ppm) ratio >1.0, a CDBI<50%, and a $g'_{vis}$≥0.98; wherein the Layer A is substantially free of polyethylene having a $g'_{vis}$<0.98. Such films surprising can be used in shrink film and/or draw tape bag applications such as those described in WO 2010/138276, incorporated herein by reference in its entirety.

In particular such embodiments, the lower limit on the amount of ethylene-based polymer composition in Layer A may be 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 95.0 wt. %, 97.5 wt. %, 99.0 wt. %, 99.5 wt. % or 100.0 wt. %. The upper limit on the amount of ethylene-based polymer in Layer A may be 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 95.0 wt. %, 97.5 wt. %, 99.0 wt. %, 99.5 wt. % or 100.0 wt. %. Any combination lower and upper limits should be considered to be disclosed by the above limits, e.g., 55.0 to 95.0 wt. %, 75.0 to 90.0 wt. %, 90.0 to 99.0 wt. %, 95.0 to 97.5 wt. %, etc. Higher amounts are generally preferred. All amounts are based on the total weight of Layer A.

The ethylene based polymer composition has a hafnium:zirconium (ppm/ppm) ratio >1.0. The hafnium:zirconium ratios and concentrations described herein are those ratios and concentrations associated with catalyst residues and do not include hafnium or zirconium form other intentional or inadvertent sources. In particular embodiments, the ethylene-based polymer composition described herein includes <5.0 ppm hafnium, generally less than 2.0 ppm hafnium, preferably less than 1.5 ppm hafnium, more preferably less than 1.0 ppm hafnium. In an embodiment, the composition contains from about 0.01 ppm to about 2 ppm hafnium, preferably in the range of from about 0.01 ppm to about 1.5 ppm hafnium, more preferably in the range of from about 0.01 ppm to 1.0 ppm hafnium. While zirconium generally is present as an impurity in hafnium, it will be realized in some embodiments where particularly pure hafnium-containing catalysts are used, the amount residual of zirconium from the catalyst may be extremely low, resulting in an undetectable amount of zirconium in the ethylene-based polymer. Thus, the upper limit on the ratio of hafnium to zirconium in the polymer can be 50.0, 100.0, 200.0, 500.0, or more. But in other embodiments, the ratio of hafnium:zirconium (ppm/ppm) is ≤2.0, ≤10.0, ≤15.0, ≤17.0, ≤20.0, or ≤about 25.0.

While the ethylene-based polymer compositions useful in the films described herein generally have a CDBI<50.0%, some have a CDBI preferably 20.0% to <50.0%, or 20.0% to <40.0%, or 20.0% to 35.0%. In another embodiment, the ethylene-based polymer composition has a CDBI of from 35.0% to 45.0% or from 25.0% to 28.0%. Further details of determining the CDBI of a copolymer are known to those skilled in the art. See, for example, WO 93/03093, published Feb. 18, 1993.

The ethylene-base polymer composition has a linear structure that is consistent with a branching index, $g'_{vis} \geq 0.98$. Some suitable polymer compositions have a $g'_{vis} \geq 0.985$, ≥0.99, ≥0.995, or 1.0. While such values are indicative of little to no long-chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

Various methods are known for determining the presence of long chain branches. For example, long-chain branching can be determined using $^{13}C$ nuclear magnetic resonance (NMR) spectroscopy and to a limited extent, e.g., for ethylene homopolymers and for certain copolymers, and it can be quantified using the method of Randall (Journal of Macromolecular Science, Rev. Macromol. Chem. Phys., C29 (2&3), pp. 285-297). Although conventional $^{13}C$ NMR spectroscopy cannot determine the length of a long chain branch in excess of about six carbon atoms, there are other known techniques useful for quantifying or determining the presence of long chain branches in ethylene-based polymers, such as ethylene/1-octene interpolymers. For those ethylene-based polymers wherein the $^{13}C$ resonances of the comonomer overlap completely with the $^{13}C$ resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}C$-labeled ethylene. In this case, the resonances associated with macromer incorporation will be significantly enhanced in intensity and will show coupling to neighboring $^{13}C$ carbons, whereas the octene resonances will be unenhanced.

Alternatively, the degree of long-chain branching in ethylene-based polymers may be quantified by determination of the branching index, $g'_{vis}$. The branching index $g'_{vis}$ is defined by the following equation:

$$g'_{vis} = \frac{IV_{Br}}{IV_{Lin}}\bigg|_{Mw}$$

where $IV_{Br}$ is the intrinsic viscosity of the ethylene-based polymer composition and $IV_{Lin}$ is the intrinsic viscosity of the corresponding linear ethylene-based polymer having substantially the same weight average molecular weight and molecular weight distribution as the ethylene-based polymer composition and in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in Macromolecules, 2000, 33, pp. 7489-7499. Intrinsic viscosity may be determined by dissolving the linear and branched polymers in an appropriate solvent, e.g., trichlorobenzene, typically measured at 135° C. Another method for measuring the intrinsic viscosity of a polymer is ASTM D5225-98—Standard Test Method for Measuring Solution Viscosity of Polymers with a Differential Viscometer, which is incorporated by reference herein in its entirety.

The branching index $g'_{vis}$ is inversely proportional to the amount of branching. Thus, lower values for g' indicate relatively higher amounts of branching. The amounts of short and long-chain branching each contribute to the branching index according to the formula: $g'_{vis}=g'_{LCB} \times g'_{SCB}$. Thus, the branching index due to long-chain branching may be calculated from the experimentally determined value for g' as described by Scholte, et al., in J. App. Polymer Sci., 29, pp. 3763-3782 (1984), incorporated herein by reference.

The ethylene-based polymer compositions useful in Layer A have one or more of the following features.

The ethylene-based polymer composition of Layer A typically comprises at least 50.0 mole % of polymer units derived from ethylene. In some embodiments, the lower limit on the range of ethylene content may be 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole % based on the mole % of polymer units derived from ethylene. Ethylene-based polymers of the invention can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. Ethylene-based polymers generally have less than 50.0 mole % of polymer units derived from a $C_3$ to $C_{20}$ olefin, preferably an alpha-olefin. The lower limit on the range of $C_3$ to $C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. The upper limit on the range of $C_3$ to $C_{20}$ olefin content may be 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. In some embodiments, low $C_3$ to $C_{20}$ olefin contents, e.g., 0.0-5.0 mole % are preferred. Comonomer content is based on the total content of all monomers in the polymer.

While any $C_3$ to $C_{20}$ olefin may be used, alpha-olefins are preferred, particularly $C_4$ to $C_8$ alpha-olefins, e.g., butene-1, pentene-1,4-methyl-1-pentene, hexene-1, octene-1, more preferably butene-1, hexene-1 and octene-1, most preferably hexene-1. Ethylene-based polymers having more than two types of monomers, such as terpolymers, are intended to be included within the term "polymer" or "copolymer" as used herein.

The ethylene-based polymers in certain embodiments have a melt index (MI) or ($I_{2.16}$) as measured by ASTM D-1238-E (190° C./2.16 kg) of about 0.1 to about 300 g/10 min., preferably about 0.1 to about 100 g/10 min., about 0.1 to about 50 g/10 min., about 0.1 g/10 min. to about 5.0 g/10 min., about 0.2 to 1.5 g/10 min., about 0.3 to 1.0 g/10 min., 0.5 to 1.0 g/10 min., 0.6 to 1.0 g/10 min., 0.7 to 1.0 g/10 min., or 0.75 to 0.95 g/10 min., particularly about 0.8 g/10 min.

Some ethylene-based polymers have a melt index ratio ($I_{21.6}/I_{2.16}$) ($I_{21.6}$ is measured by ASTM D-1238-F, i.e., 190° C./21.6 kg) of from about 10.0 to about 50.0. The polymers, in a preferred embodiment, have a melt index ratio of from about 15.0 to about 45.0, more preferably from about 18.0 to about 40.0, about 16 to about 30.0, or from about 22 to about 38.

The weight average molecular weight ($M_w$) may be from about $1.50 \times 10^4$ to about $2.50 \times 10^5$ g/mol. Preferably, the weight average molecular weight is from about $2.00 \times 10^4$ to about $2.00 \times 10^5$ g/mol, or from about $2.50 \times 10^4$ to about 1.50 $2.00 \times 10^5$ g/mol.

The ethylene-based polymers have a molecular weight distribution ($M_w/M_n$) of from about 1.5 to about 5.0, particularly from about 2.0 to about 4.5, about 2.0 to about 4.0, preferably from about 3.0 to about 4.0. The ratio of the z-average molecular weight ($M_z$) to weight average molecular weight ($M_w$) may be >about 1.5 or >about 1.7 or >about 2.0. In one embodiment, this ratio is from about 1.7 to about 3.5. In yet another embodiment, this ratio is from about 2.0 to about 3.0, or from about 2.2 to about 3.0.

The density may be in the range of from 0.86 g/cm$^3$ to 0.97 g/cm$^3$, preferably in the range of from 0.900 g/cm$^3$ to 0.965 g/cm$^3$, more preferably in the range of from 0.905 g/cm$^3$ to 0.955 g/cm$^3$, 0.910 g/cm$^3$ to 0.955 g/cm$^3$, or from 0.910 to 0.925 g/cm$^3$. In some embodiments, ethylene-based polymer has a density of about 0.912 to about 0.925 g/cm$^3$, from about 0.915 to about 0.921 g/cm$^3$, or about 0.916 to 0.918 g/cm$^3$.

Preferably, the ethylene-based polymer is one having at least a first peak and a second peak in a comonomer distribution analysis. In some embodiments having a first and second such peak, preferably the first peak has a maximum at a log($M_w$) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis may have a maximum at a log($M_w$) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.

Ethylene-based polymers produced using the catalyst systems described herein may have an SDBI>15° C., or >16° C., or >17° C., or >18° C., or >19° C., or >20° C. In one embodiment, the polymers have a SDBI of from about 18° C. to about 22° C. In another embodiment, the polymers have a SDBI of from about 18.7° C. to about 21.4° C. In another embodiment, the polymers have a SDBI of from about 20° C. to about 22° C. Further details of determining the SDBI of a copolymer are known to those skilled in the art. See, for example, WO 93/03093, published Feb. 18, 1993.

In some embodiments, ethylene-based polymers exhibit a melting temperature as measured by differential scanning calorimetry ("DSC") of from about 90° C. to about 130° C. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output, $\Delta H_{f1}$ is recorded as the area under the melting peak curve of the sample. The thermal output in joules is a measure of the heat of fusion. The melting temperature, $T_m$, is recorded as the temperature of the greatest heat absorption within the range of melting of the sample. This is called the first melt. $T_{c1}$ is the first non-isothermal crystallization temperature, which is recorded as the temperature of greatest heat generation. The sample is then cooled. The sample is reheated to form a second melt, which is more reproducible than the first melt. The peak melting temperature from the second melt is recorded as the second melting temperature, $T_m$. $T_{c2}$ is second non-isothermal crystallization temperature, and $\Delta H_{c2}$ is the second heat of crystallization. Preferably, ethylene-based polymers of these embodiments exhibit a $2^{nd}$ melt temperature of from about 100° C. to about 130° C., or about 110° C. to about 130° C., or from about 119° C. to about 123° C. Preferably, ethylene-based polymers of these embodiments exhibit a first melt temperature of from about 95° C. to about 125° C., or from about 100° C. to about 118° C., or from about 107° C. to about 110° C.

Particular ethylene-based polymers have at least a first peak and a second peak in a comonomer distribution analysis, wherein the first peak has a maximum at a log($M_w$) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log($M_w$) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.; a melt index (190° C./2.16 kg) of from about 0.1 g/10 min. to about 5.0 g/10 min.; a melt index ratio of from about 15 to about 30; a $M_w$ of from about $2.00 \times 10^4$ to about $2.00 \times 10^5$ g/mol; a $M_w/M_n$ of from about 2.0 to about 4.5; and a density of from 0.910 to 0.925 g/cm$^3$. More preferred polymers also have therein an amount of hafnium that is > the amount of zirconium, particularly a ratio of hafnium:zirconium (ppm/ppm) is at least 2.0, at least 10.0, at least 15.0, at least 17.0, at least 20.0, or at least about 25.0.

Ethylene-based polymers typically have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt. %. In some embodiments a substantially uniform comonomer <8.0 wt. %, <5.0 wt. %, or <2.0 wt. %.

Both a substantially uniform and an orthogonal comonomer distribution can be determined using fractionation techniques such as gel permeation chromatography-differential viscometry (GPC-DV), temperature rising elution fraction-differential viscometry (TREF-DV) or cross-fractionation techniques.

Polymerization processes for making ethylene-based polymer described herein are disclosed in U.S. Pat. No. 6,956,088 to Farley, including use of a hafnium transition metal metallocene-type catalyst system as described in U.S. Pat. No. 6,242,545 and/or U.S. Pat. No. 6,248,845, particularly Example 1, hereby incorporated by reference.

While the polymerization processes are described therein, certain features are reproduced here for convenience.

As described therein, polymerization catalyst in a supported form, for example deposited on, bonded to, contacted with, or incorporated within, adsorbed or absorbed in, or on, a support or carrier may be used. The metallocene catalyst may be introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be >4 hours, but shorter times are suitable.

The substituted bulky ligand hafnium transition metal metallocene-type catalyst compounds and catalyst systems discussed above are suited for the polymerization of monomers, and optionally one or more comonomers, in any polymerization process, solution phase, gas phase or slurry phase. Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100-500 psig (680-3448 kPag), or in the range of from 200-400 psig (1379-2759 kPag), or in the range of from 250-350 psig (1724-2414 kPag). The reactor temperature may vary between 60-120° C., or 60-115° C., or in the range of from 70-110° C., or in the range of from 70-95° C., or 70-90° C. The productivity of the catalyst or catalyst system is influenced by the main monomer partial pressure. The mole percentage of the main monomer, ethylene, is from 25.0-90.0 mole %, or 50.0-90.0 mole %, or 70.0-85.0 mole %, and the monomer partial pressure is in the range of from 75-300 psia (517-2069 kPa), or 100-275 psia (689-1894 kPa), or 150-265 psia (1034-1826 kPa), or 200-250 psia (1378-1722 kPa), typical conditions in a gas phase polymerization process.

Other gas phase processes contemplated by the process of the invention include those described in U.S. Pat. Nos. 5,627,242; 5,665,818; and 5,677,375; and European publications EP-A-0 794 200; EP-A-0 802 202; and EP-B-634 421, all of which are herein fully incorporated by reference.

It may be beneficial to operate in the substantial absence of or essentially free of any scavengers, such as triethylaluminum, trimethylaluminum, triisobutylaluminum and tri-n-hexylaluminum and diethyl aluminum chloride and the like. This process is described in WO 96/08520, which is herein fully incorporated by reference.

A slurry polymerization process generally uses pressures in the range of 1 to 50 atmospheres and even greater and temperatures in the range of 0° C. to 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Hexane or isobutane medium may be employed.

Ethylene-based polymers may be prepared by a process referred to as a particle form, or slurry process where the temperature is kept below the temperature at which the polymer goes into solution. Such technique is well known in the art, see for instance U.S. Pat. No. 3,248,179, which is fully incorporated herein by reference. The temperature in the particle form process is within the range of 85-110° C. (185-230° F.) Two polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Typical reactors for producing ethylene-based polymers are capable of producing >500 lbs/hr (227 Kg/hr) to 200,000 lbs/hr (90,900 Kg/hr) or higher of polymer, or >1000 lbs/hr (455 Kg/hr), or >10,000 lbs/hr (4540 Kg/hr), or >25,000 lbs/hr (11,300 Kg/hr), or >35,000 lbs/hr (15,900 Kg/hr), or >50,000 lbs/hr (22,700 Kg/hr), or >65,000 lbs/hr (29,000 Kg/hr) to >100,000 lbs/hr (45,500 Kg/hr).

Persons having skill in the art will recognize that the above-described processes may be tailored to achieve desired ethylene-based polymer resins. For example, comonomer to ethylene concentration or flow rate ratios are commonly used to control resin density. Similarly, hydrogen to ethylene concentrations or flow rate ratios are commonly used to control resin molecular weight. In both cases, higher levels of a modifier result in lower values of the respective resin parameter. Gas concentrations may be measured by, for example, an on-line gas chromatograph or similar apparatus to ensure relatively constant composition of recycle gas streams.

Additionally, the use of a process continuity aid, while not required, may be desirable in preparing the ethylene-based polymers, particularly for large-scale production. Such continuity aids are well known to persons of skill in the art and include, for example, metal stearates.

Layer A may optionally include one or more other polymer, particularly polyolefin, more particularly polyethylene, compositions. Such compositions may be present in Layer A in an amount of 0 to 50.0 wt. %. The lower limit on the range of amounts in Layer A may be 50.0 wt. %, 45.0 wt. %, 40.0 wt. %, 35.0 wt. %, 30.0 wt. %, 25.0 wt. %, 20.0 wt. %, 15.0 wt. %, 10.0 wt. %, 5.0 wt. %, 2.5 wt. %, 1.0 wt. %, 0.5 wt. % or 0.0 wt. %. The upper limit on the amount of ethylene-based polymer in Layer A may be 50.0 wt. %, 45.0 wt. %, 40.0 wt. %, 35.0 wt. %, 30.0 wt. %, 25.0 wt. %, 20.0 wt. %, 15.0 wt. %, 10.0 wt. %, 5.0 wt. %, 2.5 wt. %, 1.0 wt. %, 0.5 wt. % or 0.0 wt. %. Any combination lower and upper limits should be considered to be disclosed by the above limits, e.g., 5.0 to 45.0 wt. %, 10.0 to 25.0 wt. %, 1.0 to 10.0 wt. %, 2.5 to 5.0 wt. %, etc. All amounts are based on the total weight of Layer A.

One exemplary such polymer is a heterogeneously branched linear polyethylene having a $g'_{vis} \geq 0.98$. The term "heterogeneously branched linear ethylene polymer" refers to a polymer having polymer units derived from ethylene and preferably at least one $C_3$ to $C_{20}$ alpha-olefin and having a CDBI<50.0%. Typically such polymers are the result of a Ziegler polymerization process. Such polymers are also referred to as LLDPEs, more particularly sometimes as ZN LLDPEs.

Heterogeneously branched linear ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, linear homopolymer polyethylene has neither branched nor highly branched fractions, but is linear.

Some heterogeneously branched linear ethylene polymers have lower amounts of the highly branched fraction, but have a greater amount of the medium branched fraction. While ATREF will show homogeneously branched ethylene polymers typically are characterized by a single relatively narrow peak at some elution temperature, some heterogeneously branched ethylene polymers have a broad branching distribution, as represented by the breadth of elution temperatures over which the polymer fractions elute. Such polymers may also have a distinct peak at an elution temperature characteristic of a "linear", "high density" or "crystalline" polymer fraction.

Another exemplary polymer composition comprises ethylene copolymer having at least 50 wt. % ethylene-derived units and up to 50 wt. %, preferably 1 wt. % to 35 wt. %, even more preferably 1 wt. % to 6 wt. % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.930 g/cm³, preferably 0.915 to 0.923 g/cm³), a CDBI of 60% to 80%, preferably between 65% and 80%, and a melt index, $I_{2.16}$ of about 0.5 to 5.0 g/10 min. Preferably these polymers are metallocene polyethylenes (mPEs). Such ethylene copolymers are available from ExxonMobil Chemical Company under the tradename Exceed™ mPEs.

Yet another exemplary suitable polymer that may be present in Layer A along with the ethylene-based polymer composition is an ethylene copolymer comprising units derived from ethylene and at least one alpha olefin having at least 5 carbon atoms, having a melt index of from 0.1 to 15; a CDBI of at least 70%, and a density of 0.910 to 0.950 g/cm³ (preferably 0.915 to 0.940 g/cm³, preferably 0.918 to 0.923 g/cm³), a melt index of about 0.1 to 3.0 g/min. Some such ethylene copolymers have a $0.87 \leq g'_{vis} \leq 0.97$. Some such mPEs are available from ExxonMobil Chemical Company under the tradename Enable™ mPE resins.

In some embodiments, Layer A is substantially free of one or more such other polymers. Preferably, Layer A is substantially free of a polyethylene having $0.50 \leq g'_{vis} \leq 0.85$. In some embodiments, Layer A is substantially free of a polyethylene having a lower limit on the $g'_{vis}$ of about 0.55, 0.60, 0.65, 0.70, 0.74, 0.75, 0.77, 0.80, 0.82, or 0.85. The upper limit on the $g'_{vis}$ of polyethylenes that are substantially absent form Layer A may be 0.57, 0.60, 0.65, 0.70, 0.74, 0.75, 0.77, 0.80, 0.82, or 0.85. Any combination lower and upper limits should be considered to be disclosed by the above limits, e.g., 0.55 to 0.85, 0.70 to 0.85, 0.65 to 0.80, 0.65 to 0.70, etc. Preferably, the Layer A is substantially free of a high pressure polyethylene homopolymer or copolymer, which may or may not have a branching index within a particular range. Such polyethylenes are typically made by a tubular process, although autoclave reactors can also be used. The overall process is a free-radical polymerization in a tube reactor containing a process fluid, where the process fluid partially comprised of ethylene and the ethylene, including any comonomer, is converted to polymer in a highly exothermic reaction. The reaction occurs under high operating pressure (about 1000 bar to 4000 bar) in turbulent process fluid flow conditions at maximum temperatures of about 160° C. to about 360° C. The reaction initiation temperature, or the temperature in which the monomer (and optional comonomer) to polymer conversion is initiated (or in the case where there are multiple reaction points along the reaction tube, reinitiated), is from about 120° C. to about 240° C. Typical single-pass conversion values for a tubular reactor range from about 20 to about 40 percent. The resulting low density polyethylene is highly branched and typically has ≥50.0 mole % polymer units derived from ethylene and, optionally, one or more comonomers, e.g., vinyl acetate (sometimes referred to as "LDPE," "HPPE," or "EVA copolymer").

Additives can be provided in the various film layers, as is well-known.

Other embodiments provide a cast film, consisting essentially of a Layer A comprising 90.0 to 100.0 wt. %, particularly 95.0 to 100.0 wt. % or 97.5 to 100.0 wt. %, based on the weight of the film, of an ethylene-based polymer, the ethylene-based polymer composition having a hafnium:zirconium (ppm/ppm) ratio >1.0; a CDBI<50%, particularly 20.0% to <50.0%, or 20.0% to <40.0%, or 20.0% to 35.0%; and a $g'_{vis} \geq 0.98$; wherein the film is substantially free of a polyethylene having $0.50 \leq g'_{vis} \leq 0.85$, particularly a high-pressure low density polyethylene, wherein the film has a Dart A Impact Strength of >400.0 g/mil, particularly 400.0 to 1400.0 g/mil, 600.0 to 1400.0 g/mil, 800.0 to 1400.0 g/mil, 1000.0 to 1400.0 g/mil; and an MD Elmendorf Tear of >400.0 g/mil, particularly 400.0 to 2000.0 g/mil, 600.0 to 1500.0 g/mil, or 800.0 to 1200.0 g/mil. In some embodiments, the MD Elmendorf Tear is 400.0 to about 700.0 g/mil or 400.0 to about 600.0 g/mil. In some embodiments, the cast film is a monolayer film suitable for draw tape bags.

In particular embodiments, the films may consist essentially of a Layer A comprising 90.0 to 100.0 wt. %, particularly 95.0 to 100.0 wt. % or 97.5 to 100.0 wt. %, based on the weight of the film, of an ethylene-based polymer, the ethylene-based polymer composition having a hafnium:zirconium (ppm/ppm) ratio >1.0; a CDBI<50%, particularly 20.0% to <50.0%, or 20.0% to <40.0%, or 20.0% to 35.0%; and a $g'_{vis} \geq 0.98$, a density of 0.940 to 0.965 g/cm³, a melt index of 3.0 to 5.0 g/10 min., and a $g'_{vis} \geq 0.98$; wherein the film is substantially free of a polyethylene having $0.50 \leq g'_{vis} < 0.85$, particularly a high-pressure low density polyethylene, wherein the film has a TD shrink of at least 10.0%> a reference film consisting essentially of a second ethylene-based polymer, the second ethylene-based polymer composition having a hafnium:zirconium (ppm/ppm) ratio <1.0 and a $g'_{vis} \geq 0.98$. Particular films are cast films. Some embodiments shrink at least 10% more than a reference film comprising or consisting essentially of an second ethylene-based copolymer composition additionally having one or more of the following features: at least 50 wt. % ethylene-derived units and up to 50 wt. %, preferably 1 wt. % to 35 wt. %, even more preferably 1 wt. % to 6 wt. % of a $C_3$ to $C_{20}$ comonomer (preferably hexene or octene), based upon the weight of the copolymer; having CDBI of 60% or more, preferably 60% to 80%, preferably 65% to 80%; a density of 0.910 to 0.950 g/cm³ (preferably 0.915 to 0.930 g/cm³, preferably 0.915 to 0.923 g/cm³), and/or a melt index, $I_{2.16}$ of about 0.5 to 5.0 g/10 min.

In addition to the properties already mentioned, specific embodiments may have one or more of the following additional or more specific properties.

As mentioned above, some films surprising have a TD shrink of at least 10.0%. In particular embodiments, the TD shrink is 12.5%, 15.0%, 17.5%, 20.0%, 22.5%, 25.0%, or 30.0%. Some films have a relative shrink of 20.0%, 50.0%, 75.0%, 100.0%, 110.0%, 125.0%, 150.0%, 175.0%, 200.0%, 225.0%, 250.0%, 275.0%, or 300.0%, when compared to a film made in substantially the same way with a polymer composition that is substantially free of the ethylene-based polymer composition described herein, e.g., a film consisting essentially of polyethylene composition having a hafnium:zirconium (ppm/ppm) ratio <1.0 and a $g'_{vis} \geq 0.98$; all wt. % values based on the weight of the composition; a film consisting essentially of a heterogeneously branched linear polyethylene having a $g'_{vis} \geq 0.98$, preferably 0.99 or above; a film consisting essentially of an ethylene copolymer comprising ≥50.0 wt. % ethylene-derived units and ≤50.0 wt. %, preferably 1.0 wt. % to 35.0 wt. %, 1.0 wt. % to 6.0 wt. % of a $C_3$ to $C_{20}$ comonomer-derived units, based upon the weight of the copolymer, a CDBI of 60% or more, preferably 60% to 80%, preferably 65% to 80%, and density of 0.910 to 0.950 g/cm³; or an ethylene copolymer comprising units derived from ethylene and at least one alpha olefin having at least 5 carbon atoms, having a Melt Index of from 0.1 to 15; a CDBI of at least 70%, and a density of from 0.910 to 0.930 g/cm³, optionally, $0.87 \leq g'_{vis} \leq 0.97$.

Dart A Impact Strength of >400.0 g/mil and an MD Elmendorf Tear may be >400.0 g/mil. Particular such films may have a Dart A Impact ≥500.0 g/mil, ≥700.0 g/mil, ≥800.0 g/mil, ≥900.0 g/mil, ≥1000.0 g/mil, ≥1100.0 g/mil, ≥1200.0 g/mil, particularly from 200.0 to 1400.0 g/mil, 700.0 to 1400.0 g/mil, or 700.0 to 1200.0 g/mil. Particular films may also have an MD Elmendorf Tear of 425 to 750 g/mil, 450 to 725 g/mil, or 525 to 675 g/mil.

1% Secant Moduli in one or more of the MD and TD directions is an indicator of film stiffness and suitability for certain purposes. In some embodiments, the films have a MD 1% Secant Modulus of 20.0 to 70.0, particularly 50 to 70.0 kpsi, more particularly 55.0 to 65.0 kpsi. Some films have a TD 1% Secant Modulus of 25.0 to 75.0 kpsi, particularly 50.0 to 70.0 kpsi, more particularly 55.0 to 70.0 kpsi. More specifically some films have an average of the MD and TD 1% Secant Moduli of ≥40.0, ≥50.0, or ≥55.0 kpsi, particularly 40.0 to 70 kpsi, 50.0 to 70.0 kpsi, or 55.0 to 70.0 kpsi. A high average 1% Secant Modulus is indicative of stiffness is both MD and TD. The high stiffness is also indicated by the normalized 1% Secant values. Thus, in some embodiments, the films have a normalized MD 1% Secant Modulus of 50.0 to 85.0 kpsi, particularly 55.0 to 80.0 kpsi, or 60 to 80.0 kpsi. Likewise, some films have a TD 1% Secant Modulus of 60.0 to 95.0 kpsi, particularly 65.0 to 95.0, or 70.0 to 85.0 kpsi. High stiffness is a feature that is desirable for certain applications and difficult to achieve, particularly with desirable Elmendorf Tear and/or Dart Impact properties.

Thus, particular films may have an MD Elmendorf Tear of MD Elmendorf Tear of 425 to 750 g/mil, 450 to 725 g/mil, or 525 to 675 g/mil, a Dart A Impact Strength of 700.0 to 1400.0 g/mil, or 700.0 to 1200.0 g/mil, and an average of the MD and TD 1% Secant Moduli of 30.0 to 37.5 kpsi, 32.0 to 35.0 kpsi, or 33.0 to 35.0 kpsi.

Methods of Making Films and Method of Increasing TD Shrink

As discussed above, it had been believed that ethylene-based polymers with little to no long-chain branching were unsuitable for shrink film applications. Surprisingly, the ethylene based polymers described herein provide films that have shrink properties. Thus, one aspect of the invention provides a method of increasing the TD shrink of a film by providing the ethylene polymer composition described herein. The TD shrink may be measured as an absolute shrink value or with reference to a film that is substantially free of the ethylene-based polymer composition.

Thus, in particular embodiments, the invention provides a method of increasing TD shrink, the method comprising: a) providing a polyethylene composition comprising 50.0 to 100.0 wt. %, of an ethylene-based polymer, the ethylene-based polymer composition having a hafnium:zirconium (ppm/ppm) ratio >1.0, a CDBI<50%, and a $g'_{vis} \geq 0.98$; and 0 to 50.0 wt. % of a second ethylene-based polymer, the second ethylene-based polymer composition having a hafnium:zirconium (ppm/ppm) ratio <1.0 and a $g'_{vis} \geq 0.98$; all wt. % values based on the weight of the composition; b) forming the polyethylene composition into a film; and c) orienting the film in at least the transverse direction; wherein the film has a TD shrink at least 10%> the TD shrink of a reference film, the reference film consisting essentially of the second ethylene-based polymer.

Some such methods may be blown film methods, which can include uniaxially and biaxially oriented films. Orientation in the direction of extrusion is known as machine direction (MD) orientation. Orientation perpendicular to the direction of extrusion is known as transverse direction (TD) orientation. The film may be oriented to the same or different extent in each direction. Orientation may be accomplished by stretching a film first in the MD followed by TD orientation, by stretching in the TD followed by stretching in the MD, or by stretching in both MD and TD simultaneously.

In particular blown film methods, forming the polyethylene composition into a film includes extruding the polyethylene composition through an annular die to form an extruded tube of molten material to provide the tube with a tube diameter which is substantially the annular die diameter; while continuously extruding the tube, expanding the tube, downstream of said annular die, to attenuate the walls thereof to form the tube of molten material into a bubble of a bubble diameter which exceeds (i) the annular die diameter and (ii) the tube diameter; wherein said bubble has a frost line which comprises a demarcation line between said molten material and solid biaxially oriented film; said frost line located on the bubble at a height of least 5, preferably 10, preferably 20 times the die diameter.

Some films described herein are made by a cast film process. Typically, in a cast film process, forming the polyethylene composition into a film includes melt extruding the polyethylene composition through a flat or slot die to form an extrudate that is continuously moved onto a polished turning roller, where it is quenched from one side. The speed of the roller controls the draw ratio and final film thickness. The film may then be then sent to a second roller for cooling on the other side. Typically, although not necessarily, the film passes through a system of rollers and is wound onto a roll. Most flat dies are of T-slot or coat hanger designs, which contain a manifold to spread the flowing polymer across the width of the die, followed downstream by alternating narrow and open slits to create the desired flow distribution and pressure drop.

Suitable blown film and cast film process are described in detail in "Plastics Films" by John H. Briston, Longman Scientific and Technical, 1986, incorporated herein by reference in its entirety.

PARTICULAR EMBODIMENTS

Embodiment A provides a film, comprising: a Layer A comprising 50.0 to 100.0 wt. %, based on the weight of the Layer A, of an ethylene-based polymer composition, the ethylene-based polymer composition having therein a hafnium:zirconium (ppm/ppm) ratio >1.0, a CDBI<50%, and a $g'_{vis} \geq 0.98$; wherein the Layer A is substantially free of a polyethylene having a $0.50 \leq g'_{vis} \leq 0.85$, particularly being substantially free of a high-pressure low density polyethylene.

Embodiment B provides the film of Embodiment A, wherein the hafnium concentration in the ethylene-based polymer composition is <5.0 ppm, <2.0 ppm, <1.5 ppm, <1.0 ppm, about 0.01 ppm to about 2 ppm, about 0.01 ppm to about 1.5 ppm, or about 0.01 ppm to 1.0 ppm.

Embodiment C provides the film of Embodiment A or B, wherein the hafnium:zirconium (ppm/ppm) ratio is ≤2.0, ≤10.0, ≤15.0, ≤17.0, ≤20.0, or ≤about 25.0.

Embodiment D provides the film of any of Embodiments A-C, wherein the ethylene-based polymer composition has a melt index of from about 0.1 g/10 min. to about 5.0 g/10 min., g/10 min., about 0.2 to 1.5 g/10 min., about 0.3 to 1.0 g/10 min., 0.5 to 1.0 g/10 min., 0.6 to 1.0 g/10 min., 0.7 to 1.0 g/10 min., or 0.75 to 0.95 g/10 min., particularly about 0.8 g/10 min.; wherein the ethylene-based polymer composition has a melt index ratio of from 10.0 to about 50.0, about 15.0 to about 45.0, about 18.0 to about 40.0, about 18.0 to about 30.0, or from about 22 to about 38, wherein the ethylene-based polymer has a $M_w$ of from $1.5 \times 10^4$ to about $2.502.00 \times 10^5$ g/mol.; preferably from about $2.00 \times 10^4$ to about $2.00 \times 10^5$ g/mol., more particularly from about $2.50 \times 10^4$ to about $1.502.00 \times 10^5$ g/mol.; a $M_w/M_n$ of from about 2.0 to about 4.5, particularly about 2.0 to about 4.0, more particularly from about 3.0 to about 4.0; and a density of from 0.900 to 0.965 g/cm³; 0.910 g/cm³ to 0.955 g/cm³, 0.910 to 0.925 g/cm³, particularly about 0.912 to about 0.925 g/cm³, about 0.915 to about 0.921 g/cm³, or about 0.916 to 0.918 g/cm³.

Embodiment E provides the film of any of Embodiments A-D; wherein the ethylene based polymer composition has a melt index of from about 0.1 g/10 min. to about 5.0 g/10 min.; a melt index ratio of from about 16 to about 30; a weight average molecular weight ($M_w$) of from about $2.00 \times 10^4$ to about $2.00 \times 10^5$ g/mol; a molecular weight distribution ($M_w/M_n$) of from about 2.0 to about 4.5; and a density of from 0.900 to 0.965 g/cm³.

Embodiment F provides the film of any of Embodiments A-E, wherein the ethylene-based polymer composition has a melt index of from about 0.5 to 1.0 g/10 min., a melt index ratio of from 18.0 to about 30.0 a $M_w$ of from about $2.00 \times 10^4$ to about $2.0 \times 10^5$ g/mol, $M_w/M_n$ of from about 2.0 to about 4.0, and a density of from 0.910 to 0.925 g/cm³.

Embodiment G provides the film of any of Embodiments A-F, wherein the ethylene-based polymer composition has a CDBI>40%, >30%, from 20% to 50%, from 20% to 35%, or from 25% to 28%.

Embodiment H provides the film of any of Embodiments A-G, wherein the ethylene-based polymer composition has at least a first peak and a second peak in a comonomer distribution analysis.

Embodiment I provides the film of any of Embodiments A-H, wherein the ethylene-based polymer composition has at least a first peak and a second peak in a comonomer distribution analysis, wherein the first peak has a maximum at a $\log(M_w)$ value of 4.0 to 5.4 and a TREF elution temperature of 70.0° C. to 100.0° C. and the second peak has a maximum at a $\log(M_w)$ value of 5.0 to 6.0 and a TREF elution temperature of 40.0° C. to 70.0° C.

Embodiment J provides the film of any of Embodiments A-I, wherein the ethylene-based polymer composition has at least a first peak and a second peak in a comonomer distribution analysis, wherein the first peak has a maximum at a $\log(M_w)$ value of 4.3 to 5.0 and a TREF elution temperature of 80.0° C. to 95.0° C. and the second peak has a maximum at a $\log(M_w)$ value of 5.3 to 5.7 and a TREF elution temperature of 45.0° C. to 60.0° C.

Embodiment K provides the film of any of Embodiments A-J, wherein the ethylene-based polymer composition has at least a first peak and a second peak in a comonomer distribution analysis, wherein the first peak has a maximum at a $\log(M_w)$ value of 4.5 to 4.7 and a TREF elution temperature of 85.0° C. to 90.0° C. and the second peak has a maximum at a $\log(M_w)$ value of 5.4 to 5.6 and a TREF elution temperature of 48.0° C. to 54.0° C.

Embodiment L provides the film of any of Embodiments A-K, wherein the Layer A is substantially free of one or more of:
  a) a heterogeneously branched linear polyethylene having a $g'_{vis} \leq 0.98$, preferably 0.99 or above;
  b) an ethylene copolymer comprising ≥50.0 wt. % ethylene-derived units and ≤50.0 wt. %, preferably 1.0 wt. % to 35.0 wt. %, 1.0 wt. % to 6.0 wt. % of a $C_3$ to $C_{20}$ comonomer-derived units, based upon the weight of the copolymer, a CDBI of 60% or more, preferably 60% to 80%, preferably 65% to 80%, and density of 0.910 to 0.950 g/cm³; and
  c) an ethylene copolymer comprising units derived from ethylene and at least one alpha olefin having at least 5 carbon atoms, having a Melt Index of from 0.1 to 15; a CDBI of at least 70%, and a density of from 0.910 to 0.930 g/cm³; and optionally $0.87 \leq g'_{vis} \leq 0.97$.

Embodiment M provides the film of any of Embodiments A-L, wherein the film is a blown, cast, or coextruded film.

Embodiment N provides the film of any of Embodiments A-M, wherein the film is a cast film.

Embodiment O provides the film of any of Embodiments A-N, wherein the film is a monolayer film.

Embodiment P provides the film of any of Embodiments A-N further comprising a Layer B in surface contact with a first side of Layer A; and Layer C in surface contact with a second side of Layer A.

Embodiment Q provides a film, consisting essentially of a Layer A comprising 90.0 to 100.0 wt. % or 95.0 to 100.0 wt. %, based on the weight of the film, of an ethylene-based polymer composition of any of Embodiments A-K, particularly wherein the ethylene-based polymer composition has a density of 0.940 to 0.965 g/cm$^3$, a melt index of 3.0 to 5.0 g/10 min., and a g'$_{vis}$≥0.98; wherein the film is substantially free of a polyethylene having 0.50≤g'$_{vis}$≤0.85, particularly a high-pressure low density polyethylene, wherein the film has a TD shrink of at least 10.0% greater than a reference film consisting essentially of a second ethylene-based polymer, the second ethylene-based polymer composition having a hafnium:zirconium (ppm/ppm) ratio <1.0 and a g'$_{vis}$≥0.98.

Embodiment R provides a film according to Embodiment Q, wherein the film is a cast film, particularly a cast film consisting essentially of the ethylene polymer of any of Embodiments A-K.

Embodiment S provides a cast film, consisting essentially of a Layer A comprising 90.0 to 100.0 wt. % or 95.0 to 100.0 wt. %, based on the weight of the film, of an ethylene-based polymer composition, of an ethylene-based polymer of any of Embodiments A-K, wherein the film has a Dart A Impact Strength of >400.0 g/mil, particularly 400.0 to 1400.0 g/mil and an MD Elmendorf Tear of >400.0 g/mil, particularly 400.0 to 2000.0 g/mil.

Embodiment S, wherein the film is a in the form of a draw tape bag structure.

Embodiment T provides film of any of Embodiments A-S, particularly Embodiments A-K, wherein the film has a TD shrink of at least 10.0%, 15.0%, 20.0%, 25.0%, or 30.0%.

Embodiment U provides the film of any of Embodiments A-R, wherein the film has a Dart A Impact Strength of 400.0 to 1400.0 g/mil, particularly 600.0 to 1400.0 g/mil, 800.0 to 1400.0 g/mil, 1000.0 to 1400.0 g/mil; and an MD Elmendorf Tear of >400.0 g/mil, particularly 600.0 to 1400.0, 800.0 to 1400.0, 1000.0 to 1400.0; and an MD Elmendorf Tear of >400.0 g/mil, particularly 400.0 to 2000.0 g/mil, 600.0 to 1500.0 g/mil, or 800.0 to 1200.0 g/mil; particularly where the film has an average of the MD and TD 1% Secant Moduli>35.0 kpsi.

Embodiment V provides a method of increasing TD shrink, the method comprising:
a) providing a polyethylene composition comprising 50.0 to 100.0 wt. %, of an ethylene-based polymer composition, the ethylene-based polymer composition; and 0 to 50.0 wt. % of a second ethylene-based polymer, the second ethylene-based polymer having a hafnium:zirconium (ppm/ppm) ratio <1.0 and a g'$_{vis}$≥0.98; all wt. % values based on the weight of the polyethylene composition;
b) forming the polyethylene composition into a film; and
c) orienting the film in at least the transverse direction;
wherein the film has a TD shrink at least 10% greater than the TD shrink of a reference film, the reference film consisting essentially of the second ethylene-based polymer.

Embodiment W provides a method of increasing TD shrink according to Embodiment V, wherein ethylene-based polymer composition comprises the ethylene based polymer composition of any of Embodiments A-K, particularly wherein the ethylene-based polymer composition has a density 0.940 to 0.965, more particularly 0.940 to 0.950 g/cm$^3$.

Embodiment X provides a method of increasing TD shrink according to Embodiment V or W, wherein the polyethylene composition comprises 90.0 to 100.0 wt. % of an ethylene based polymer composition according to any of Embodiments A-K.

Embodiment Y provides a method of increasing TD shrink according any of Embodiments V-X, wherein the film consists essentially of an ethylene-based polymer composition according to any of Embodiments A-K.

Embodiment Z provides a draw tape bag comprising: a) a bag structure having a hem and comprising: a Layer A comprising 90.0 to 100.0 wt. %, based on the weight of the film of an ethylene-based polymer composition according to any of Embodiments A-K with the provision that the density is 0.910 to about 0.930 g/cm$^3$, wherein the film is substantially free of a polyethylene having 0.50≤g'$_{vis}$≤0.85, particularly a high pressure polyethylene, and wherein the film has a Dart A Impact Strength of 400.0 to 1400.0 g/mil and an MD Elmendorf Tear of 400.0 to 2000.0 g/mil; and b) a thermoplastic draw tape housed within the hem.

Embodiment AA provides the draw tape bag of embodiments encompassed by Embodiment Z, wherein the bag structure includes a first sidewall; a second sidewall, the second sidewall joined to the first sidewall by a closed bottom end, a first edge, and a second edge, thereby defining an open top end having a top surface with a top length; and at least one of the sidewalls forming the hem having a top length and extending along the open top end disposed opposite the bottom end having a bottom length, the hem including one or more draw tape notches.

EXAMPLES

PE1 is made according to U.S. Pat. No. 6,956,088 using the bis(n-propylcyclopentadienyl)HfCl$_2$/MAO catalyst system under polymerization conditions to produce an ethylene-hexene polymer (PE1) having a density of 0.9459 g/cm$^3$, a melt index (I$_{2.16}$) of nominally 4.1 g/10 min., and a melt index ratio (I$_{21.6}$/I$_{2.16}$) of about 16.8. PE1 has a comonomer content of about 0.8 wt. %, a Mn of 32,162 g/mol, a M$_w$ of 84,160 g/mol, a Mz of 166,160 g/mol, M$_w$/M$_n$ (MWD) of 2.62, and an M$_z$/M$_w$ of 1.97. PE1 has a DSC 2$^{nd}$ melting temperature of 129.1° C., crystallization peaks at temperatures of 115.5° C. (main) and 80.3° C. (minor), and a heat of fusion, ΔH$_f$, of 181.46 J/g.

PE2 is made according to U.S. Pat. No. 6,956,088 using the bis(n-propylcyclopentadienyl)HfCl$_2$/MAO catalyst system under polymerization conditions to produce an ethylene-hexene polymer (PE2) having a density of 0.9208 g/cm$^3$, a melt index (I$_{2.16}$) of nominally 0.75 g/10 min., and a melt index ratio (I$_{21.6}$/I$_{2.16}$) of about 32.3.

PE3 is made according to U.S. Pat. No. 6,956,088 using the bis(n-propylcyclopentadienyl)HfCl$_2$/MAO catalyst system under polymerization conditions to produce an ethylene-hexene polymer (PE3) having a density of 0.9186 g/cm$^3$, a melt index (I$_{2.16}$) of nominally 0.81 g/10 min., and a melt index ratio (I$_{21.6}$/I$_{2.16}$) of about 22.5.

Figure 1:
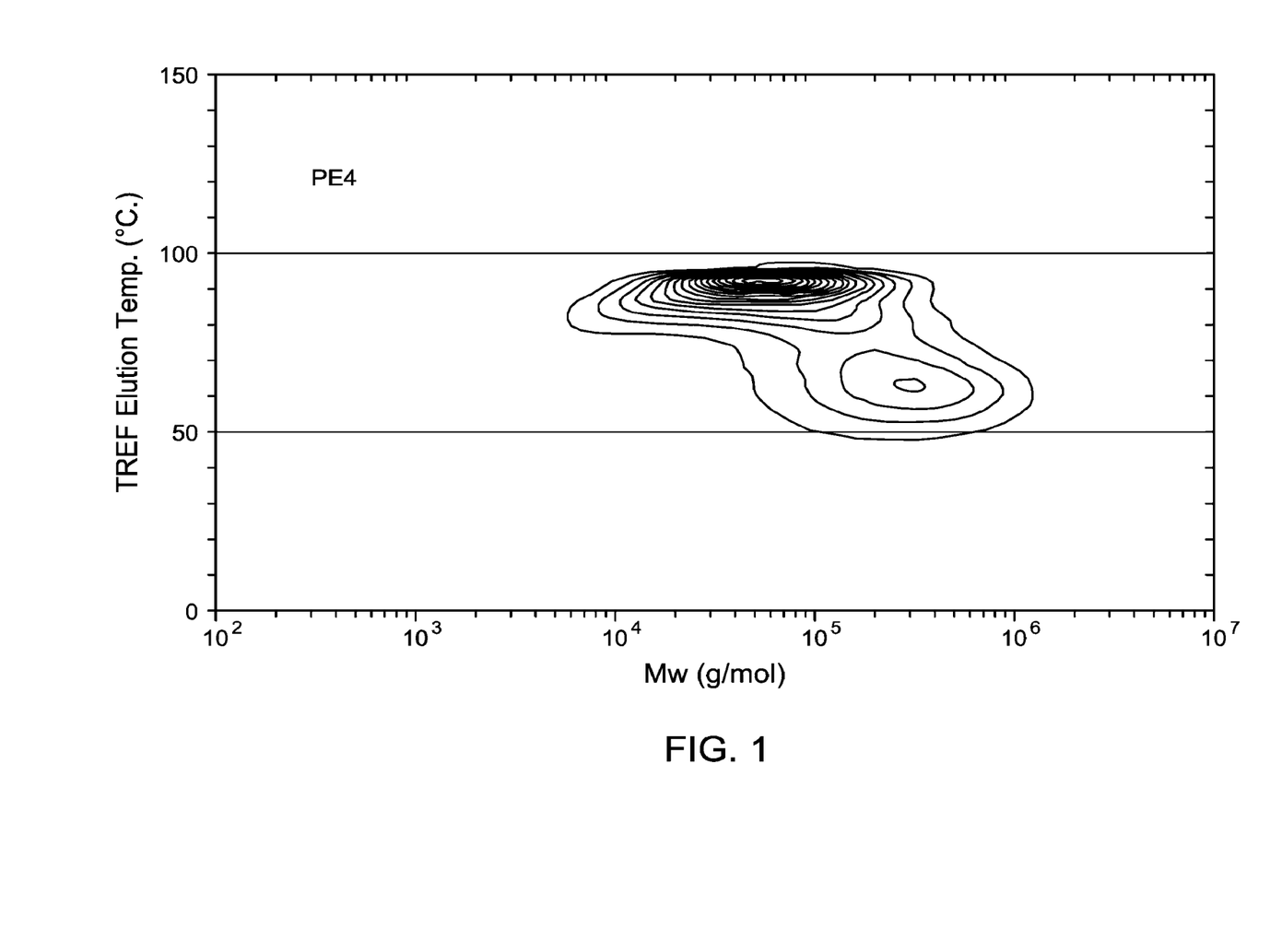
FIG. 1 depicts the TREF Elution Temperature versus molecular weight for PE3, an ethylene-based polymer having therein a hafnium:zirconium (ppm/ppm) ratio >1.0, a CDBI less than 50%, and a $g'_{vis} \geq 0.98$.

PE4 is made according to U.S. Pat. No. 6,956,088 using the bis(n-propylcyclopentadienyl)HfCl$_2$/MAO catalyst system under polymerization conditions to produce an ethylene-based polymer (PE4) having a density of 0.918 g/cm$^3$, a melt index (I$_{2.16}$) of 0.80 g/10 min., and a melt index ratio (I$_{21.6}$/I$_{2.16}$) of 32. As shown in FIG. 1, PE1 has a first peak corresponding to a log(M$_w$) value of about 4.5 that appears at a TREF elution temperature of 91.0° C. and a second peak at a log($M_w$) value of 5.3 and a TREF elution temperature of 63.0° C.

Figure 2:
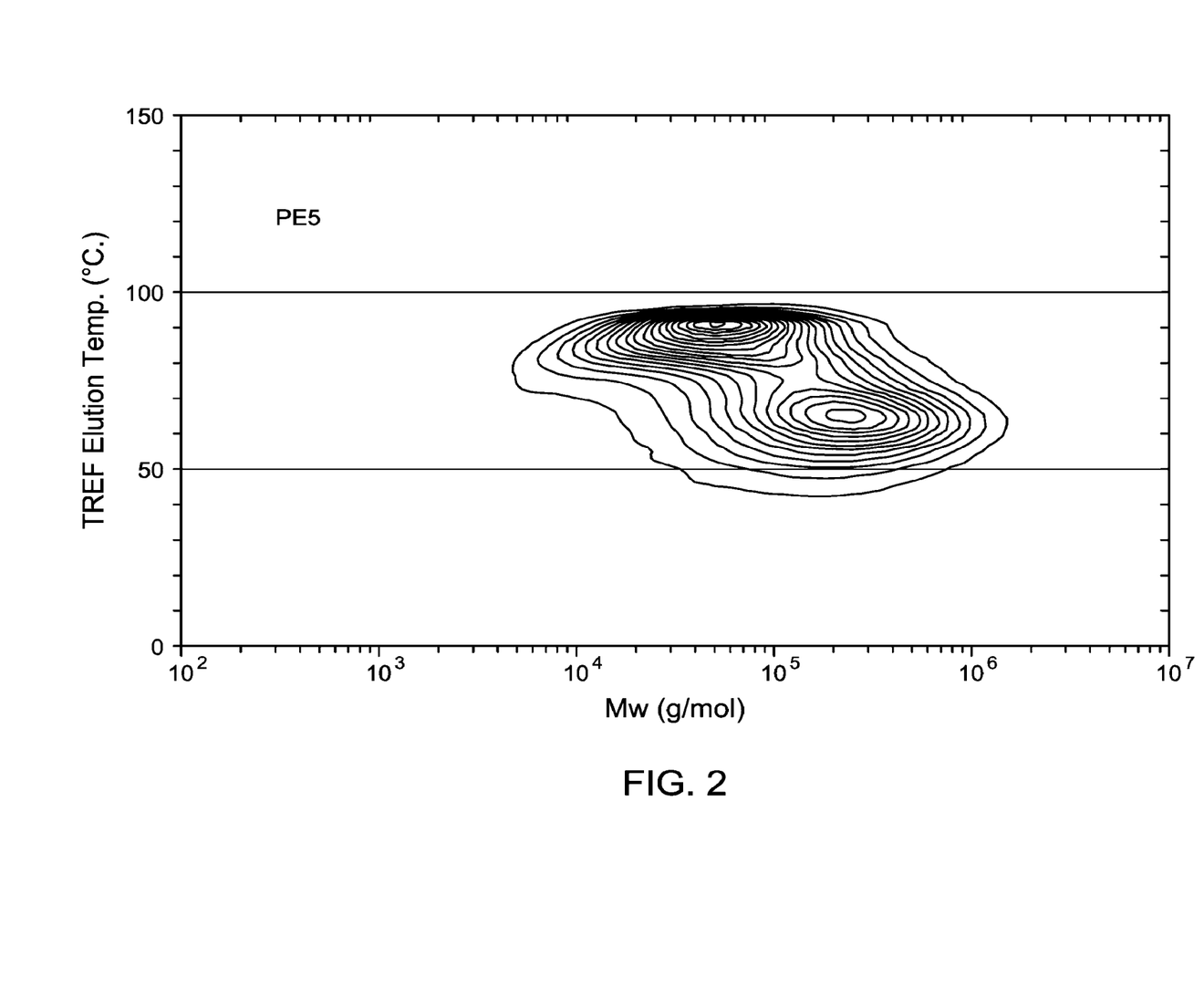
FIG. 2 depicts the TREF Elution Temperature versus molecular weight for PE4, an ethylene-based polymer having therein a hafnium:zirconium (ppm/ppm) ratio >1.0, a CDBI less than 50%, and a $g'_{vis} \geq 0.98$.

PE5 is made according to U.S. Pat. No. 6,956,088 using the bis(n-propylcyclopentadienyl)HfCl$_2$/MAO catalyst system under polymerization conditions to produce an ethylene-based polymer (PE5) having a density of 0.916 g/cm$^3$ and a melt index ($I_{2.16}$) of 0.70 g/10 min. As shown in FIG. 2, PE2 has a first peak corresponding to a log($M_w$) value of about 4.5 that appears at a TREF elution temperature of 91.0° C. and a second peak at a log($M_w$) value of 5.2 and a TREF elution temperature of 63.0° C.

Figure 3:
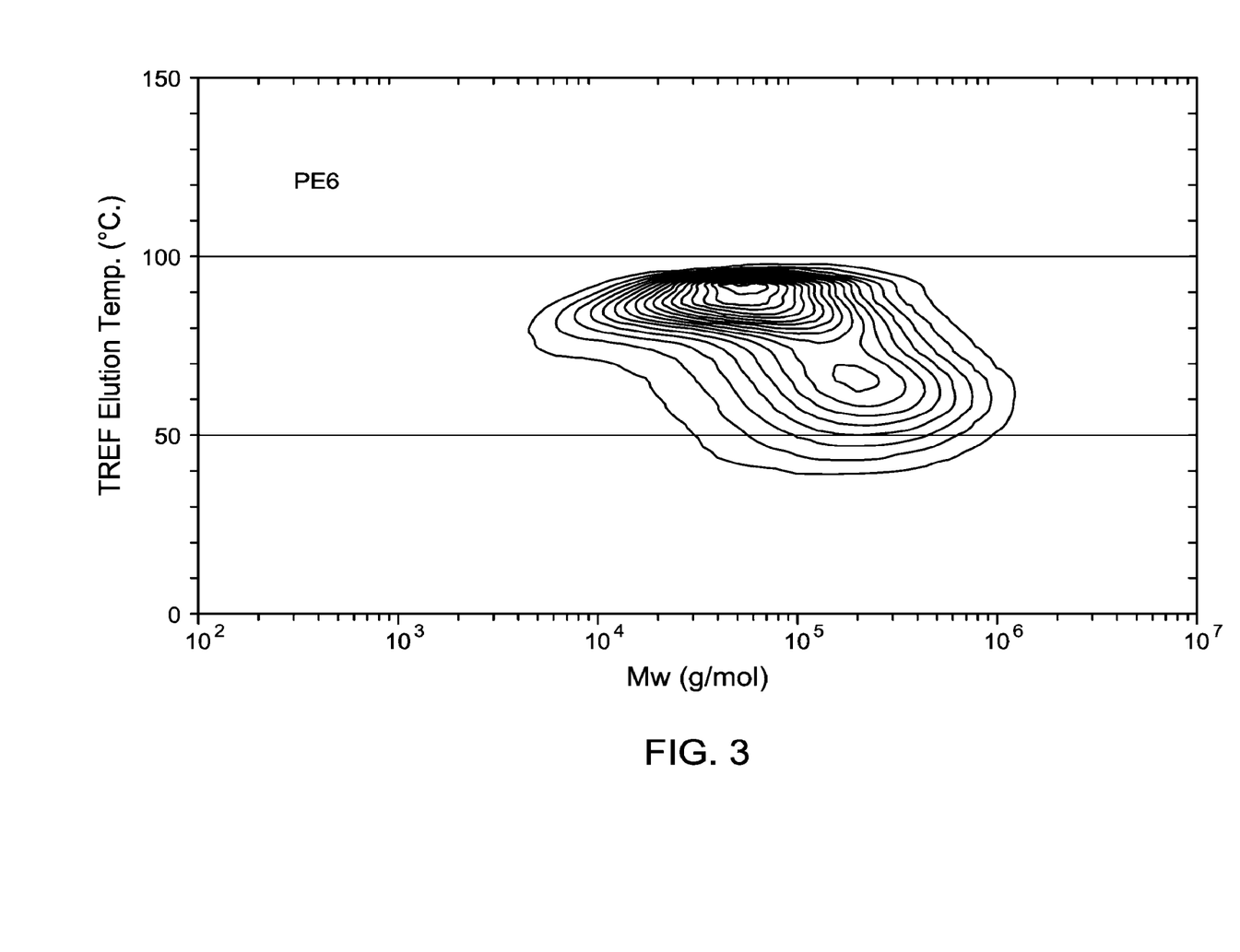
FIG. 3 depicts the TREF Elution Temperature versus molecular weight for PE5, an ethylene-based polymer having therein a hafnium:zirconium (ppm/ppm) ratio >1.0, a CDBI less than 50%, and a $g'_{vis} \geq 0.98$.

PE6 is made according to U.S. Pat. No. 6,956,088 using the bis(n-propylcyclopentadienyl)HfCl$_2$/MAO catalyst system under polymerization conditions to produce an ethylene-based polymer (PE6) having a density of 0.917 g/cm$^3$, a melt index ($I_{2.16}$) of 0.90 g/10 min., a melt index ratio ($I_{21.6}/I_{2.16}$) of 24.4. As shown in FIG. 3, PE3 has a first peak corresponding to a log($M_w$) value of about 4.4 that appears at a TREF elution temperature of 91.0° C. and a second peak at a log($M_w$) value of 5.1 and a TREF elution temperature of 62.0° C.

Examples 1 and 2

In Examples 1 and 2, PE1 is formed into a cast film (nominal 0.8 mil Gauge) using a Black-Clawson™ cast film line under high rate case of 575 lb/hr and a low rate of 400 lb/hr, respectively. Features of the cast film processing conditions are recorded in Table 1. Features of the resulting films are collected in Table 2.

Comparative Examples 3-4

In Comparative Examples 3 and 4, a heterogeneously branched linear ethylene copolymer having melt index ($I_{2.16}$) of 4.3 g/10 min., a density of 0.942 g/cm$^3$, a g'$_{vis}$≤0.98 a CDBI<50.0%, available from ExxonMobil Chemical Company as LL3404.48 (referred to hereafter as znPE1), is formed into reference cast films under high and low through-put conditions substantially similar to those of Examples 1 and 2, respectively. Features of the cast film processing conditions are recorded in Table 1. Features of the resulting films are collected in Table 2.

Comparative Examples 5 and 6

In Comparative Example 5, a 70.0 wt. % of linear metallocene-catalyzed ethylene/hexene copolymer having a melt index of 3.5 g/10 min., a density of 0.927 g/cm$^3$, a CBDI>60% available from ExxonMobil Chemical Company as Exceed™ 3527PA mPE. (referred to hereafter as mPE1), is blended with 30.0 wt. % of a high density polyethylene available from ExxonMobil Chemical Company as HD7925.30 (referred to hereafter as "HD1") to provide a film having a stiffness comparable to that of PE1. The blend is formed into a reference cast film under substantially the same conditions as the high through-put conditions of Example 1.

In Comparative Example 6, mPE1 without the HDPE is formed into a reference cast film under substantially the same low through-put conditions as Example 2. Features of the cast film processing conditions are recorded in Table 1. Features of the resulting films are collected in Table 2.

TABLE 1

Cast Film Extrusion Parameters

| Example | 1 | 2 | CE3 | CE4 | CE5 | CE6 |
|---|---|---|---|---|---|---|
| Resin | PE1 | PE1 | znPE1 | znPE1 | mPE1/HD1 | mPE1 |
| Thruput Setpoint, lb/hr | 575 | 400 | 575 | 400 | 575 | 400 |
| Downcomer Thruput, lb/hr | 579 | 407 | 578 | 406 | 571 | 398 |
| Extruder Speed, rpm | 72.1 | 48.1 | 76.8 | 49.4 | 76.4 | 46.1 |
| Extruder Amps | 228 | 180 | 201 | 160 | 219 | 196 |
| Upstream Melt Temp, ° F. | 525 | 511 | 519 | 507 | 525 | 513 |
| Head Pressure, psi | 2672 | 2100 | 2437 | 1893 | 2730 | 2337 |
| Screen Pressure, psi | 1463 | 1133 | 1360 | 1055 | 1558 | 1260 |
| Line Speed, fpm | 622 | 415 | 622 | 414 | 710 | 450 |
| Treater Speed, fpm | 621 | 418 | 620 | 417 | 707 | 453 |
| Layflat, in | 35.00 | 35.75 | 34.50 | 35.00 | 34.75 | 34.50 |
| Primary Chill Roll Supply, ° F. | 75.0 | 75.2 | 75.0 | 75.5 | 75.0 | 74.5 |
| Secondary Chill Roll Supply, ° F. | 77.9 | 75.7 | 75.2 | 79.1 | 79.6 | 78.6 |

TABLE 2

Cast Film Properties

| Example 1 | 1 | 2 | CE3 | CE4 | CE5 | CE6 |
|---|---|---|---|---|---|---|
| Resin | PE1 | PE1 | znPE1 | znPE1 | mPE1/HD1 | mPE1 |
| Gauge, mils | 0.80 | 0.84 | 0.79 | 0.83 | 0.83 | 0.87 |
| Tensile @ Yield, psi | | | | | | |
| MD | 2,274 | 2,355 | 2,327 | 2,370 | 2,103 | 1,312 |
| TD | 2,566 | 2,438 | 2,376 | 2,420 | 1,817 | 1,167 |
| Elongation @ Yield, % | | | | | | |
| MD | 7 | 6 | 8 | 8 | 12 | 8 |
| TD | 8 | 9 | 8 | 9 | 10 | 7 |
| Ultimate Tensile, psi | | | | | | |
| MD | 5,478 | 5,020 | 6,110 | 5,980 | 7,115 | 5,375 |
| TD | 4,998 | 4,862 | 4,514 | 4,587 | 4,804 | 4,016 |

TABLE 2-continued

Cast Film Properties

| Example 1 | 1 | 2 | CE3 | CE4 | CE5 | CE6 |
|---|---|---|---|---|---|---|
| Break Elongation, % | | | | | | |
| MD | 621 | 630 | 587 | 624 | 657 | 541 |
| TD | 774 | 751 | 793 | 791 | 755 | 587 |
| 1% Secant Modulus, | | | | | | |
| MD, psi | 60,072 | 58,320 | 56,613 | 50,549 | 46,227 | 24,019 |
| MD, psi/mil | 75,090 | 69,428 | 71662 | 60,902 | 55,695 | 27,608 |
| TD, psi | 66,722 | 61,822 | 66,669 | 61,746 | 56,634 | 25,067 |
| TD, psi/mil | 83,402 | 73,597 | 84,391 | 74,392 | 68233 | 28,812 |
| Average, psi | 63397 | 60071 | 61641 | 56147 | 51430 | 24543 |
| Puncture (A) | | | | | | |
| Peak Force, lbs | 3.5 | 3.6 | 4.2 | 3.9 | 7.1 | 7.8 |
| Peak Force, lbs/mil | 4.4 | 4.2 | 5.3 | 4.7 | 8.5 | 9.0 |
| Break Energy, in · lb | 2.4 | 2.1 | 4.9 | 4.3 | 12.2 | 18.1 |
| Break Energy, in · lb/mil | 3.0 | 2.5 | 6.2 | 5.2 | 14.7 | 20.8 |
| Elmendorf Tear | | | | | | |
| MD, g | 22 | 28 | 24 | 27 | 39 | 62 |
| MD, g/mil | 28 | 33 | 29 | 32 | 45 | 70 |
| TD, g | 73 | 53 | 137 | 100 | 365 | 300 |
| TD, g/mil | 90 | 65 | 168 | 123 | 417 | 338 |
| Dart Drop, g | <49 | <49 | <49 | <49 | <49 | <49 |
| g/mil | <61 | <58 | <62 | <59 | <59 | <56 |
| 45° Gloss | | | | | | |
| MD | 65 | 61 | 85 | 86 | 89 | 85 |
| TD | 64 | 61 | 85 | 86 | 88 | 85 |
| Haze, % | 8.8 | 10.3 | 3.0 | 3.2 | 2.7 | 3.0 |
| Shrinkage, % | | | | | | |
| MD | 37 | 39 | 52 | 45 | | |
| TD | 19 | 15 | 6 | 7 | | |
| Relative TD Shrink | 3.16 | 2.14 | 1 | 1 | | |
| % increase in Shrink | 216 | 114 | — | — | — | — |

As the data in Table 2 show, the high throughput film of Example 1, surprisingly shows a TD shrink value of 19% while that of the Ziegler-Natta catalyzed polyethylene of high throughput film Comparative Example 3 is just 6%, representing a 216% increase in TD shrink despite the lack of significant long-chain branching. Likewise, TD shrink of the Ziegler-Natta catalyzed polyethylene of low throughput film Comparative Example 4 is just 7%, representing a 114% increase in TD shrink despite the lack of significant long-chain branching.

When compared to a conventional metallocene catalyzed linear polyethylene of Comparative Example 5, the polymer of Example 1 can provide suitable stiffness without the need for a high density component. And when run in low throughput processes, the resulting film shows a surprisingly improved Tensile @ yield, break elongation and 1% Secant Moduli.

Example 7

In Example 7, PE2 is formed into a cast film using a three-extruder Black-Clawson™ cast film line set up to make monolayer film by supplying PE2 to two of the three extruders. One extruder is equipped with a standard DSB II screw while the other includes a low work screw. Nominal conditions are a rate of 575 lb/hr, a line speed of 750 fpm and a gauge of 0.8 mils. Features of the cast film processing conditions are recorded in Table 3. Features of the resulting films are collected in Table 4.

Example 8

In Example 8, PE2 is formed into a cast film (nominal 0.8 mil Gauge) using substantially the same extruder set-up as Example 7, except that the rate is 500 lb/hr. Features of the cast film processing conditions are recorded in Table 3. Features of the resulting films are collected in Table 4.

Example 9

In Example 9, PE2 is formed into a cast film (nominal 0.8 mil Gauge) using substantially the same extruder set-up as Example 7, except that the rate is 400 lb/hr. Features of the cast film processing conditions are recorded in Table 3. Features of the resulting films are collected in Table 4.

Example 10

In Example 10, PE3 is formed into a cast film (nominal 0.8 mil Gauge) using substantially the same extruder set-up as Example 7 at a rate of 575 lb/hr. Features of the resulting films are collected in Table 4.

Example 11

In Example 11, PE3 is formed into a cast film (nominal 0.8 mil Gauge) using substantially the same extruder set-up as Example 7 at a rate of 400 lb/hr. Features of the resulting films are collected in Table 4.

Comparative Example 12

In Comparative Example 10, a linear metallocene-catalyzed ethylene/hexene copolymer having a melt index of 1.0 g/10 min., a density of 0.918 g/cm$^3$, a CBDI>60% available from ExxonMobil Chemical Company as Exceed™ 1018CA mPE (referred to hereafter as mPE2), is formed into a 0.80 mil nominal gauge film at a rate of 575 lb/hr. Features of the cast film processing conditions are recorded in Table 3. Features of the resulting films are collected in Table 4.

TABLE 3

| Processing Summary | | | | |
|---|---|---|---|---|
| Example | 7 | 8 | 9 | CE12 |
| Resin | PE2 | PE2 | PE2 | mPE2 |
| Nominal Rate, lb/hr | 575 | 500 | 400 | 575 |

TABLE 3-continued

| Processing Summary | | | | |
|---|---|---|---|---|
| Example | 7 | 8 | 9 | CE12 |
| Extruder A | | | | |
| Upstream Melt Temp, ° F. | 580 | 579 | 577 | 587 |
| Head Pres, psi | 3810 | 3460 | 3016 | 4154 |
| Amp Load | 165 | 151 | 133 | 195 |
| Screw RPM | 36 | 31 | 25 | 34 |
| Extruder B | | | | |
| Upstream Melt Temp, ° F. | 518 | 518 | 515 | 523 |
| Head Pres, psi | 3714 | 3358 | 2948 | 4190 |
| Amp Load | 178 | 162 | 143 | 211 |
| Screw RPM | 44 | 37 | 29 | 41 |
| Primary Chill Roll Supply Temp, ° F. | 78 | 78 | 79 | 78 |
| Secondary Chill Roll Supply Temp, ° F. | 80 | 77 | 80 | 79 |
| Line Speed, fpm | 769 | 668 | 537 | 769 |
| Layflat, in | 32.75 | 32.75 | 33.0 | 33.25 |
| Overall Rate, lb/hr | 568 | 492 | 405 | 574 |

TABLE 4

| Film Properties | | | | | | |
|---|---|---|---|---|---|---|
| Example | 7 | 8 | 9 | 10 | 11 | CE12 |
| Resin | PE2 | PE2 | PE2 | PE3 | PE3 | mPE1 |
| Gauge, mils | 0.85 | 0.77 | 0.72 | 0.83 | 0.82 | 0.81 |
| Tensile @ Yield, psi | | | | | | |
| MD | 1,359 | 1,255 | 1,292 | 1,129 | 1,120 | 1,198 |
| TD | 1,361 | 1,204 | 1,108 | 1,091 | 1,027 | 1,064 |
| Ultimate Tensile, psi | | | | | | |
| MD | 9,761 | 9,913 | 10,322 | 10,684 | 10,879 | 11,312 |
| TD | 6,988 | 7,236 | 6,736 | 7,231 | 6,962 | 7,754 |
| Break Elongation, % | | | | | | |
| MD | 290 | 282 | 292 | 359 | 368 | 410 |
| TD | 754 | 764 | 738 | 699 | 642 | 695 |
| 1% Secant Modulus, psi | | | | | | |
| MD | 22,714 | 20,957 | 19,295 | 19,743 | 18,584 | 18,521 |
| TD | 26,970 | 24,982 | 23,086 | 21,411 | 20,699 | 20,752 |
| Average | 24842 | 22969 | 21190 | 20577 | 19641 | 19636 |
| Elmendorf Tear | | | | | | |
| MD, g | 482 | 385 | 368 | 322 | 289 | 286 |
| MD, g/mil | 571 | 499 | 466 | 383 | 344 | 353 |
| TD, g | 401 | 412 | 370 | 425 | 399 | 375 |
| TD, g/mil | 505 | 525 | 478 | 506 | 481 | 463 |
| Dart Drop, g | 158 | 149 | 157 | 400 | 508 | 289 |
| g/mil | 186 | 194 | 218 | 482 | 620 | 357 |
| 45 deg Gloss | | | | | | |
| MD | 89 | 91 | 90 | 93 | 93 | 93 |
| TD | 91 | 91 | 92 | 92 | 93 | 93 |
| Haze, % | 1.4 | 1.3 | 1.2 | 1.0 | 1.0 | 0.6 |
| Shrinkage, % | | | | | | |
| MD | 80 | 81 | 79 | 68 | 67 | 60 |
| TD | −42 | −39 | −34 | −31 | −23 | −18 |

Dart drop test conducted with head material type C. Shrinkage test is hot air gun method for ultimate shrink. Tear numbers represent average of two runs of 10 samples each. Negative shrink values represent expansion.

The films of Examples 7-9 show MD Tear properties that are significantly greater than those of Comparative Example 12. MD Tear decreases with production rate such that Example 11 is not statistically different from that of Comparative Example 12. 1% Secant Moduli for Example 7-9 are also noticeably higher than those for Comparative Example 12. However, unlike Example 1, the films of Examples 7-10 expand in TD rather than shrink.

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All documents described herein are incorporated by reference herein, including any priority documents and/or testing procedures to the extent they are not inconsistent with this text, provided, however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A film, comprising:
    a Layer A comprising 50.0 to 100.0 wt. %, based on the weight of the Layer A, of an ethylene-based polymer composition, the ethylene-based polymer composition having therein a hafnium:zirconium (ppm/ppm) ratio >1.0, a CDBI<50%, and a $g'_{vis} \geq 0.98$; wherein the Layer A is substantially free of a polyethylene having $0.50 \leq g'_{vis} \leq 0.85$.

2. The film of claim 1, wherein the film has a TD shrink of at least 10.0%.

3. The film of claim 1, wherein the film has a Dart A Impact Strength of 400.0 to 1400.0 g/mil and an MD Elmendorf Tear of 400.0 to 2000.0 g/mil.

4. The film of claim 1, wherein the hafnium concentration in the ethylene-based polymer composition is <5.0 ppm.

5. The film of claim 1, wherein the hafnium:zirconium (ppm/ppm) ratio is ≥2.0.

6. The film of claim 1, wherein the ethylene-based polymer composition has:
    i. a melt index of from about 0.1 g/10 min. to about 5.0 g/10 min.;
    ii. a melt index ratio of from about 16 to about 30;
    iii. a weight average molecular weight ($M_w$) of from about $2.00 \times 10^4$ to about $2.00 \times 10^5$ g/mol;
    iv. a molecular weight distribution ($M_w/M_n$) of from about 2.0 to about 4.5; and
    v. a density of from 0.900 to 0.965 g/cm$^3$.

7. The film of claim 1, wherein the ethylene-based polymer composition has a CDBI 35.0 to 45.0%.

8. The film of claim 1, wherein the ethylene-based polymer composition has at least a first peak and a second peak in a comonomer distribution analysis.

9. The film of claim 1, wherein the ethylene-based polymer composition has at least a first peak and a second peak in a comonomer distribution analysis, wherein the first peak has a maximum at a log($M_w$) value of 4.0 to 5.4 and a TREF elution temperature of 70.0° C. to 100.0° C. and the second peak has a maximum at a log($M_w$) value of 5.0 to 6.0 and a TREF elution temperature of 40.0° C. to 70.0° C.

10. The film of claim 1, wherein the ethylene-based polymer composition has at least a first peak and a second peak in a comonomer distribution analysis, wherein the first peak has a maximum at a log($M_w$) value of 4.3 to 5.0 and a TREF elution temperature of 80.0° C. to 95.0° C. and the second peak has a maximum at a log($M_w$) value of 5.3 to 5.7 and a TREF elution temperature of 45.0° C. to 60.0° C.

11. The film of claim 1, wherein the ethylene-based polymer composition has at least a first peak and a second peak in a comonomer distribution analysis, wherein the first peak has a maximum at a log($M_w$) value of 4.5 to 4.7 and a TREF elution temperature of 85.0° C. to 90.0° C. and the second peak has a maximum at a log($M_w$) value of 5.4 to 5.6 and a TREF elution temperature of 48.0° C. to 54.0° C.

12. The film of claim 1, wherein the film has a Dart A Impact Strength of 850 to about 1100 g/mil and an average of the MD and TD 1% Secant Moduli >35.0 kpsi.

13. The film of claim 1, wherein the polyethylene has $0.60 \leq g'_{vis} \leq 0.80$.

14. The film of claim 1, wherein the polyethylene is a polyethylene formed by a high-pressure process.

15. The film of claim 1, wherein the Layer A is substantially free of one or more of:
    a) a heterogeneously branched linear polyethylene having a $g'_{vis} \geq 0.98$, preferably 0.99 or above;
    b) an ethylene copolymer comprising ≥50.0 wt. % ethylene-derived units and ≤50.0 wt. % of a $C_3$ to $C_{20}$ comonomer-derived units, based upon the weight of the copolymer, a CDBI of 60% or more, and density of 0.910 to 0.950 g/cm$^3$; and
    c) an ethylene copolymer comprising units derived from ethylene and at least one alpha olefin having at least 5 carbon atoms, having a Melt Index of from 0.1 to 15; a CDBI of at least 70%, and a density of from 0.910 to 0.930 g/cm$^3$.

16. The film of claim 1, wherein the film is a blown, cast or coextruded film.

17. The film of claim 1, wherein the film is a cast film.

18. The film of claim 1, wherein the film is a monolayer film.

19. The film of claim 1, further comprising a Layer B in surface contact with a first side of Layer A; and Layer C in surface contact with a second side of Layer A.

20. A method of increasing TD shrink, the method comprising:
    a) providing a polyethylene composition comprising 50.0 to 100.0 wt. % of an ethylene-based polymer, the ethylene-based polymer composition having a hafnium:zirconium (ppm/ppm) ratio >1.0, a CDBI less than 50%, and a $g'_{vis} \geq 0.98$; and 0 to 50.0 wt. % of a second ethylene-based polymer, the second ethylene-based polymer composition having a hafnium:zirconium (ppm/ppm) ratio <1.0 and a $g'_{vis} \geq 0.98$; all wt. % values based on the weight of the composition;

b) forming the polyethylene composition into a film; and
c) orienting the film in at least the transverse direction;
wherein the film has a TD shrink at least 10% greater than the TD shrink of a reference film, the reference film consisting essentially of the second ethylene-based polymer.

21. The method of claim 20, wherein the polyethylene composition comprises 90.0 to 100.0 wt. %, of the ethylene-based polymer.

22. The method of claim 21, wherein the film consists essentially of the ethylene-based polymer.

23. A film, consisting essentially of:
a) a Layer A comprising 90.0 to 100.0 wt. %, based on the weight of the film, of an ethylene-based polymer, the ethylene-based polymer composition having a hafnium:zirconium (ppm/ppm) ratio >1.0, a CDBI less than 50%, a density of 0.940 to 0.965 g/cm$^3$, a melt index of 3.0 to 5.0 g/10 min., and a $g'_{vis} \geq 0.98$; wherein the film is substantially free of a polyethylene having $0.50 \leq g'_{vis} \leq 0.85$, wherein the film has a TD shrink of at least 10.0% greater than a reference film consisting essentially of a second ethylene-based polymer, the second ethylene-based polymer composition having a hafnium:zirconium (ppm/ppm) ratio <1.0 and a $g'_{vis} \geq 0.98$.

24. The film of claim 23, wherein the film is a cast film.

25. A cast film, consisting essentially of:
a) a Layer A comprising 90.0 to 100.0 wt. %, based on the weight of the film of an ethylene-based polymer, the ethylene-based polymer composition having a hafnium:zirconium (ppm/ppm) ratio >1.0, a CDBI less than 50%, and a $g'_{vis} \geq 0.98$; wherein the film is substantially free of a polyethylene having $0.50 \leq g'_{vis} \leq 0.85$, and wherein the film has a Dart A Impact Strength of 400.0 to 1400.0 g/mil and an MD Elmendorf Tear of 400.0 to 2000.0 g/mil.

* * * * *